(No Model.)

E. ROTHLISBERGER.
TOP PROP NUT.

No. 313,774. Patented Mar. 10, 1885.

Attest.
Joseph H. Sims
Jno. S. Roebuck

Inventor
Erneste Rothlisberger
by Wood & Boyd
his Attorneys &c

N. PETERS. Photo-Lithographer, Washington, D. C.

United States Patent Office.

ERNESTE ROTHLISBERGER, OF CINCINNATI, OHIO.

TOP-PROP NUT.

SPECIFICATION forming part of Letters Patent No. 313,774, dated March 10, 1885.

Application filed October 6, 1884. (No model.)

*To all whom it may concern:*

Be it known that I, ERNESTE ROTHLISBERGER, a resident of Cincinnati, in the county of Hamilton and State of Ohio, have invented certain new and useful Improvements in Carriage-Top-Prop Nuts, of which the following is a specification.

My invention relates to an improvement in a carriage-top-prop nut which is attached to the prop-joints and other parts of the carriage by a screw-threaded shank.

The object of my invention is to provide, first, a cheap and durable prop-nut the finished surfaces of which can be readily made in dies and attached to the head of the shank, so as to hold all parts in position.

Another object of my invention is to provide a strong oval prop-nut which will hold its shape and can be made of cheap light metal, all of which will be fully set forth in the description of the accompanying drawings, in which—

Figure 1:
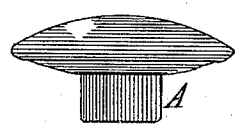
Figure 2:
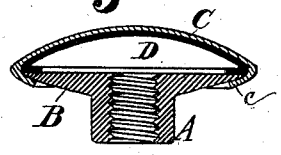
Figure 3:
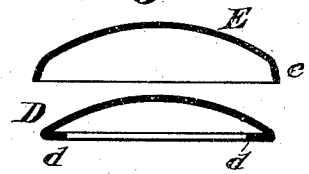
Figure 4:
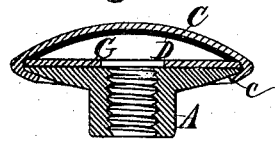

Figure 1 is a side elevation of my improved prop-nut. Fig. 2 is a central cross-section of the same. Fig. 3 represents a cross-section of the metal blank forming the supporting-plate in the first form struck up by a die, and the plate in its finished condition. Fig. 4 represents a cross-section of a modification of my improved prop-nut.

A represents the shank of the prop-nut, which is screw-threaded. B represents the head of the shank. These parts are made in one piece, of cast or wrought iron, as desired, or bent out of shape. Thus a plain strong finished surface is obtained, and the covering plate of the prop-nut may be made of very light cheap metal.

A modification of my improvement is shown in Fig. 4, which is made of three plates secured to the head of the prop-nut. C, the outer finished plate, is made and attached in in the same way as that shown in Figs. 1 and 2, but two supporting-plates are used instead of one, D representing the upper plate, made of convex form, without any horizontal flange, *d;* and a second supporting-plate, G, of horizontal shape, is placed upon the head of the prop-nut, being pierced to allow the threaded shank of the bolt to pass freely through the plate. In this modification the horizontal flange *d* is formed by the plate G instead of being formed on the plate D, as in Figs. 1, 2, 3. By this modification nearly the same strength and durability are obtained, but at the expense of three plates instead of one.

Instead of dies to shape and turn the flanges of the metal plates, the metal may be shaped by spinning, or in any other appropriate manner.

C represents the finished surface, which is made of a thin sheet of metal struck up in dies.

D represents an inside strengthening-plate. *d* represents a horizontal annular flange, struck up upon the under side of the plate D. This plate is formed as follows: A circular piece of metal is struck up in the form shown by E, Fig. 3, to form the concave fitting the finished plate. *e* represents a vertical flange or rib. A second operation in suitable dies turns the vertical flange *e* into the form and position shown by *d*, Fig. 3.

To unite the parts, plate D is placed upon the top of the head B of the prop-nut shank. Its exterior peripheral circumference is of the same size as the head B. Plate C is first struck up into the form shown by E, Fig. 3, but of sufficient size to encompass the exterior periphery of head B, and then the parts are placed in dies, and the flange *c* is turned around upon the under side of the head B and pressed firmly against the under surface of the head.

By making the plate D and annular flange *d* a very firm support is obtained to plate C, which effectually avoids the liability of becoming indented.

I have shown the finished surface to be oval or convex; but it is obvious that any desired form of contour can be employed.

I claim—

1. A carriage-top-prop nut, combining in its structure the headed shank A B, a supporting-plate, D, having a horizontal annular flange, *d*, resting upon the top and exterior surface of the head, and a covering-plate confining the supporting-plate in position, substantially as described.

2. The combination, in a carriage-top-prop nut, of the internally-threaded shank A, having a head, B, the supporting-plate D, having an annular flange, *d*, resting upon the head, and the covering-plate C, having the flange *c* underlying the head to confine the supporting-plate in position, substantially as described.

In testimony whereof I have hereunto set my hand.

ERNESTE ROTHLISBERGER.

Witnesses:
JNO. S. ROEBUCK,
M. E. MILLIKAN.